Sept. 22, 1964   W. C. ANDERSON   3,149,696
REMOVABLE POLE STEP
Filed May 13, 1963
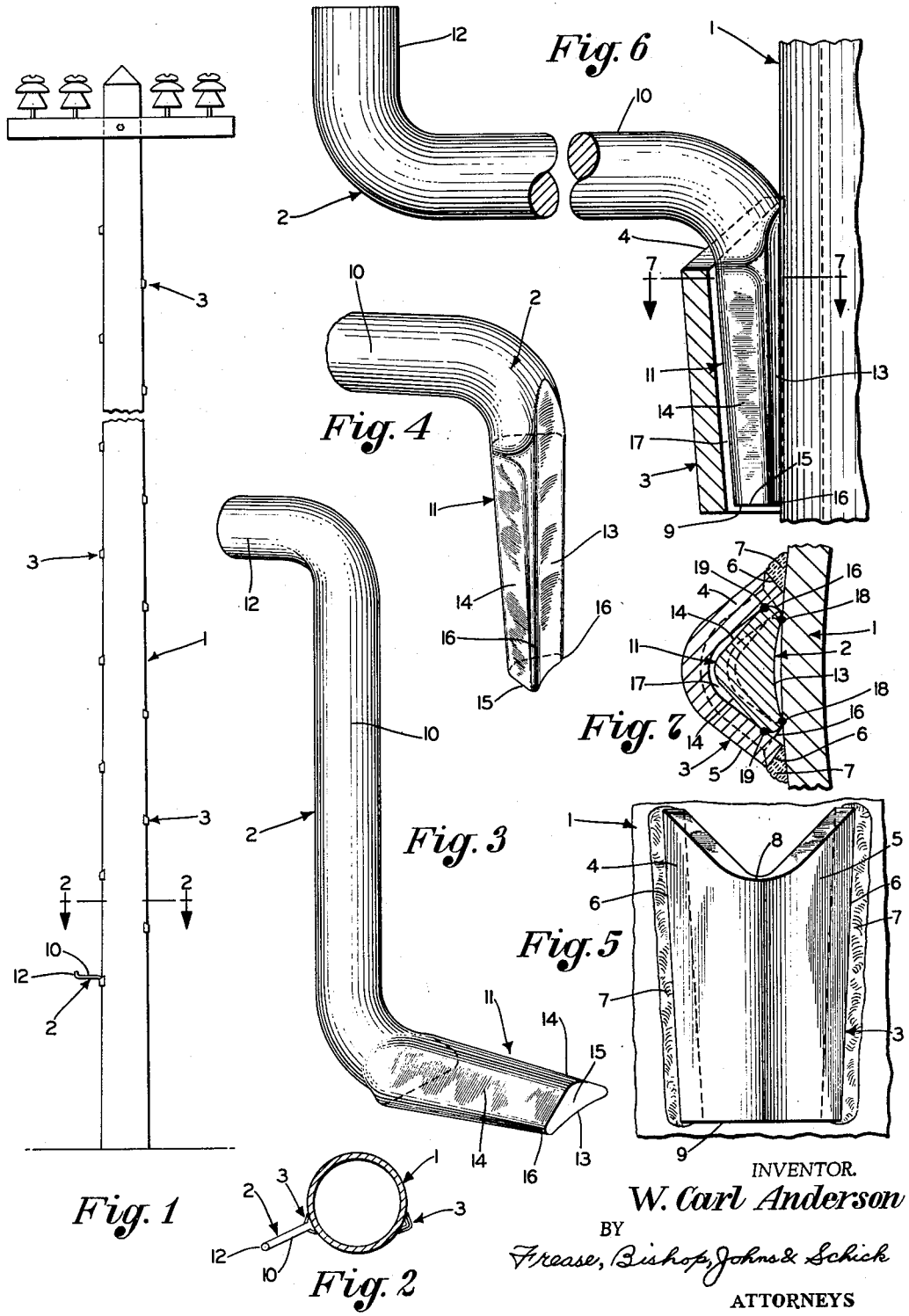
INVENTOR.
W. Carl Anderson
BY
Frease, Bishop, Johns & Schick
ATTORNEYS United States Patent Office 3,149,696
Patented Sept. 22, 1964

3,149,696
REMOVABLE POLE STEP
W. Carl Anderson, Hartville, Ohio, assignor to The Union Metal Manufacturing Company, Canton, Ohio, a corporation of Ohio
Filed May 13, 1963, Ser. No. 279,818
2 Claims. (Cl. 182—92)

The invention relates to pole steps for tubular metal poles used for example for suspending loads of various kinds, such as power transmission lines, telephone lines, traffic lights, lighting fixtures, or signs, or used as booms or masts on shipboard or as building columns; and more particularly the invention relates to a removable step construction for these types of tubular metal poles or members.

High voltage power transmission lines frequently are located in downtown areas of cities and sometimes are suspended from tall metal poles. While it is important to provide steps on such poles for access to the power transmission lines suspended from the poles, yet it is equally important that unauthorized persons be prevented from climbing the poles on steps used by authorized personnel.

Ordinarily, metal power transmission line poles are either tapered or cylindrical in extent. They may have any desired cross-sectional shape and may be either hollow or solid metal members. A preferred type of metal pole is a tapered tubular pole with the required pole wall thickness to support the load imposed upon the pole.

Various removable step constructions have been proposed or used for poles of various kinds in the past, but these prior constructions have been unsatisfactory for light gauge tubular metal transmission line poles for a number of reasons. Thus, the removable steps have been unstable, or have been subject to bending of the step or distortion or caving-in of the pole wall in use, or have been difficult to place or remove by a lineman climbing up or down along the length of the pole, or have been expensive to make or install.

Accordingly, there is an existing need by public utilities and municipalities for a simple, practical and stable removable step construction for tubular metal poles in which the step member can be placed on or removed from step-receiving pole fixtures or sockets on the pole with ease by a lineman climbing the pole without damaging the pole, and avoiding the use of pole fixtures for receiving the removable steps which are complicated in construction, which may weaken the pole, or which detract from the appearance of the pole; and which removable step construction has universality in use such that one size or style of step member may be applied to poles of different diameters or tapers and any step member will fit any step-receiving fixture or receptacle on the pole without maintaining close tolerances in the manufacture of the step members.

Thus, it is a general object of the present invention to provide a removable step construction for tubular metal poles utilizing small, close-fitting, step-receiving fixtures or sockets permanently mounted at different levels on the pole, and utilizing step members which may be interchangeably and removably, easily engaged with the sockets to provide strong and stable steps on the pole, with the step members engaged with the sockets in a stable manner against movement laterally as well as downwardly when a lineman is climbing on the steps.

Also, it is an object of the present invention to provide a removable step construction for tubular metal poles which is further characterized by being constructed to reduce to a minimum the tendency of buckling of the metal wall of the tubular pole from step-loading.

Moreover, it is an object of the present invention to provide a removable step construction for tubular metal poles in which the step-receiving sockets permanently mounted at different levels on the pole are constructed to reduce to a minimum the tendency of damage to the metal wall of the pole during shipment and erection of the pole incident to pressure or force accidentally imparted to the projecting but small, close-fitting, step-receiving sockets on the pole.

Furthermore, it is an object of the present invention to provide a strong, removable step construction for tubular metal poles adapted for use with a large range of pole diameters, either cylindrical or tapered poles, and which may be economically manufactured without close tolerance requirements while enabling any removable step member to be properly and firmly engaged with any socket on a pole.

Also, it is an object of the present invention to provide a strong and stable removable step construction for tubular metal poles combining the advantageous features and characteristics indicated, and in which any step member may be removed easily from a socket with which it has been engaged.

Finally, it is an object of the present invention to provide a new removable step construction for tubular metal poles, eliminating difficulties heretofore encountered in the art; eliminating costly structures and manufacturing problems heretofore involved; achieving the stated objects in a simple, effective and inexpensive manner; and solving problems and satisfying needs existing in the art.

These and other objects and advantages, apparent to those skilled in the art from the following description and claims, may be obtained, the stated results achieved, and the described difficulties overcome, by the apparatus, combinations, parts, elements, subcombinations, arrangements and constructions which comprise the present invention, the nature of which is set forth in the following general statement, a preferred embodiment of which—illustrative of the best mode in which applicant has contemplated applying the principles—is set forth in the following description and shown in the drawing, and which are particularly and distinctly pointed out and set forth in the appended claims forming part hereof.

The nature of the improved removable step construction of the present invention may be stated in general terms as including a plurality of step-receiving socket members permanently mounted at different levels on a metal, preferably tubular, tapered pole; successive socket members along the length or extent of the pole being located alternately at or adjacent opposite sides of the pole; a plurality of removable step members removably engageable with the socket members; each step member preferably having a Z-shape including a step portion normally located in horizontal position and extending radially of a pole when the step member is engaged with a pole socket member; the step portion terminating at one end in a downturned socket-and-pole engaging foot, and the step portion terminating at its other end preferably in a typical upturned stop flange; the step member downturned foot being generally triangularly-shaped in cross-section and having a pole engaging face and two socket engaging faces extending substantially the length of the foot; the pole engaging face being concave from side to side along the length of the foot; the socket engaging faces preferably being substantially flat faces each tapering downwardly and inwardly toward the free end of the foot and preferably being formed as surfaces of a pyramid; the socket members each comprising a V-shaped metal member having angled legs permanently fixed as by welding at the outer edges of the legs to a pole; the angled legs of the socket member presenting surfaces substantially mating with the socket engaging faces of the step member foot; and the concavity of the pole engaging face of the step member foot being greater than the convexity of the tubular pole with which the foot is engaged when the foot of any step member is inserted in a socket member.

By way of example, an embodiment of the improved removable step construction for tubular metal poles is shown in the accompanying drawing forming part hereof in which:

FIGURE 1 is a diagrammatic elevation of a tubular metal pole provided with the improved removable step construction;

FIG. 2 is a sectional view taken on the line 2—2, FIG. 1;

FIG. 3 is a perspective view of one of the improved removable step members;

FIG. 4 is a fragmentary perspective view of a portion of the improved step member looking in another direction;

FIG. 5 is a fragmentary enlarged elevation view of one of the socket members mounted on a pole;

FIG. 6 is a vertical section through the socket member illustrated in FIG. 5 with a removable step member assembled therewith; and FIG. 7 is a cross-section taken on the line 7—7, FIG. 6.

Similar numerals refer to similar parts throughout the drawing.

The improved removable pole step construction is illustrated and described with particular reference to a tapered tubular metal power transmission line pole indicated generally at 1 and includes a removable step member generally indicated at 2 and a step-receiving socket member generally indicated at 3. It is to be understood, however, that the removable step construction may be provided for any type of metal pole, whether cylindrical or tapered, or having flat or fluted faces in cross-section, and whether hollow or solid.

A plurality of the socket members 3 are permanently mounted at different levels on the pole 1 as illustrated generally in FIG. 1. Successive socket members along the length or extent of the pole are located at or adjacent opposite sides of the pole. If the pole is say 16″ in diameter or less, the successive socket members 3 may be located circumferentially 180° apart. For larger diameter poles, it is preferable to locate the successive socket members 3 spaced circumferentially less than 180° apart, as illustrated in FIGS. 1 and 2.

Each socket member 3 comprises a V-shaped (FIG. 7) metal member having angled legs 4 and 5, the outer edges 6 of which are secured as by welding at 7 to the pole 1. The angled legs 4 and 5 of each socket member 3 taper slightly downwardly of the pole 1 (FIG. 6) and inwardly of each other (FIG. 5) for a purpose to be later described. The upper edges of the socket legs 4 and 5 are notched downwardly as indicated at 8 in FIG. 5.

Furthermore, each socket member 3 is open at the bottom, as indicated at 9 in FIG. 6, to permit drainage of moisture through the socket members such as rainwater which may flow down along the pole, thus preventing the collection of moisture in the sockets which would accelerate rusting. Furthermore, metal poles of the type illustrated frequently are galvanized or provided with other types of protective metal coatings, and the bottom openings 9 of the socket members 3 mounted on the pole 1 permit drainage of the galvanizing or other coating metal when performing the coating operation.

Each step member 2 is preferably formed from a metal rod or bar and has a Z-shape including a step portion 10 which is located in a horizontal position when the step member 2 is mounted on a pole (FIGS. 1, 2 and 6). The step portion 10 terminates at one end in a downturned socket-and-pole engaging foot generally indicated at 11, and terminates at its other end preferably in a typically upturned stop flange or portion 12 (FIG. 6).

Typically, the metal pole 1 may be formed of either steel or aluminum and the socket members 3 may be formed of similar material. The step members 2 preferably are formed of a high strength aluminum alloy which is light in weight to reduce the load carried by linemen in climbing up or down a pole and carrying and using a supply of the removable steps.

Preferably, the foot portion 11 of each step member 2 is forged to a special shape, generally triangular in cross-section (FIG. 7), with a pole engaging face 13 and two socket engaging faces 14. The faces 13 and 14 extend substantially throughout the length of the foot 11, the pole engaging face 13 being concave from side to side along its length as best illustrated in FIGS. 3, 4 and 7.

The socket engaging faces 14 are preferably substantially flat faces, each tapering downwardly and inwardly toward the free end 15 of the foot 11. Furthermore, the flat faces 14 are preferably formed as surfaces of a pyramid such that if the surfaces are projected, the apex of the pyramid will lie in a projection of the concave face 13.

The corners 16 between the concave face 13 and flat faces 14 of the foot 11 are formed as small radius fillets.

Generally, the downward and inward taper of the angled legs 4 and 5 of the socket member 3 mate with the taper of the flat faces 14 of the foot 11 of the step member 2 except that the taper of the socket member legs 4 and 5 may be slightly less than the taper of the faces 14 of the foot 11 so that when a step member foot 11 is inserted in a socket member 3 (FIGS. 6 and 7), the foot starts to bind first at the top region of the socket member 3.

Furthermore, the angularity of the included angle between the angled legs 4 and 5 of the socket member 3 is preferably slightly less than the angularity of the included angle between the flat faces 14 of a step foot 11 to provide a slight clearance, illustrated in an exaggerated manner at 17 in FIGS. 6 and 7, between portions of the flat faces 14 of the foot 11 and the inner faces of the angled legs 4 and 5 of the socket member 3 when a foot 11 is inserted in a socket member 3.

The described construction and arrangement of the step foot 11 and socket member 3 is such that when a foot 11 is inserted within a socket 3 mounted on a pole 1, line contact engagement results, indicated by points 18 in FIG. 7 adjacent the foot corners 16, between the foot member 11 and outer surface of pole 1; and other line contact engagement results, indicated by points 19 in FIG. 7 adjacent foot corners 16, between the foot 11 and surfaces of the socket member legs 4 and 5.

The two line contacts 18 are spaced widely apart, as are the two line contacts 19; and a pair of contacts 18–19 at each corner 16 on the foot 11 are very close together, due to the small radius fillet of the corner 16. Thus, pairs of contacts 18–19 are as close as possible to the zones where the outer edges 6 of the angled socket legs 4 and 5 are welded at 7 to the pole 1.

The wide spacing between the pairs of line contacts 18–19 adjacent the foot corners 16 and their location close to welds 7 perform several functions. First of all, the pressure of a foot 11 engaged in a socket 3 when a lineman steps on a step 2 in climbing a pole is as close as possible to the weld 7 between the pole and the legs of the socket member. The welded joints 7 reinforce the pole wall in this zone and minimize any tendency to cave or collapse the pole wall, due to the applied load, at the line contacts 18.

Second, the wide spacing of pairs of contacts 18–19 gives maximum torsion resistance to the joint between the step 2, socket member 3 and pole 1, to the lateral components of loads applied to the steps 2 from a lineman climbing the pole.

The notched arrangement 8 at the upper end of the socket member 3 permits maximum penetration of the foot 11 within the socket member 3. Referring particularly to FIG. 7, the concavity of the concave face 13 of pole foot 11 is slightly greater than the convexity of the outer surface of the pole 1 so as to assure that the line contact engagement 18 between the foot 11 and the surface of the pole results at the indicated wide spacing.

Although the surfaces of the step portion 10 are illustrated as being smooth, these surfaces may be roughened or flattened or serrated to provide non-slip characteristics for greater safety in climbing.

A lineman using the improved step will be supplied with an adequate number of removable step members 2. As the lineman starts to climb a pole 1, step members 2 are engaged with successive socket members 3 as illustrated in FIGS. 6 and 7. When so engaged these step members provide rigid stable steps and any step member can be engaged with any socket member.

As the lineman climbs down the pole, these step members 2 may be removed simply by tapping the underside of the step portion 10 of one step with another step member to release the foot 11 from binding engagement within its socket. This release is accomplished readily because of the tapered arrangement and line contact when a foot 11 is engaged in a socket member.

The simple angled socket member construction enables the small socket members to be welded to any kind or type of metal pole and the socket members, being small and close-fitting, are not objectionable in appearance. The same type, size and style of socket member can be welded to widely different diameters and cross-sectional shapes of poles, and one step member size and shape likewise can be removably engaged with such socket members on poles of various diameters.

The removable steps may be easily assembled or removed and when in place provide a firm, stable and strong step held against lateral or downward movement when climbing loads are applied to the steps.

The various clearances provided when the step is engaged within a socket, enable economical manufacture of the socket and step members without maintaining close tolerances in the formation of the various surfaces of the foot 11 and socket member 3.

The improved removable pole step construction of the invention is not limited for use with power transmission line poles but may be used on poles from which telephone lines, traffic lights, lighting fixtures or signs are suspended or may be used on tubular metal members serving as booms or masts on shipboard or as building columns.

Accordingly, the improved construction of the present invention provides a new removable pole step construction which eliminates difficulties heretofore encountered in the art, achieves the stated objects, accomplishes the many new functions and results described, and solves problems which have existed in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact structure shown, because the sizes and shapes of the various parts and components may be varied to provide other structural embodiments, without departing from the fundamental principles of the invention.

Having now described the features, discoveries and principles of the invention, the construction, operation and use of a preferred form thereof, and the advantageous, new and useful results obtained thereby; the new and useful discoveries, principles, apparatus, combinations, parts, elements, subcombinations, structures, cooperative relationships and arrangements, and mechanical equivalents obvious to those skilled in the art are set forth in the appended claims.

I claim:

1. Removable step construction for a metal pole including a V-shaped, metal socket member having angled legs terminating in outer edges welded along said edges to the outer surface of a pole, a Z-shaped metal step member having a step portion terminating at one end in downturned foot, the foot being generally triangularly-shaped in cross-section and formed with a pole engaging face and two socket engaging faces extending substantially the length of the foot, the pole engaging face being laterally concave to a degree greater than any convexity of the surface of a pole to which said socket member is welded and forming laterally spaced zones of contact between said pole engaging face and said pole surface located adjacent the lateral extremities of said pole engaging face, the socket engaging faces being substantially flat faces each tapering downwardly and inwardly toward the free end of the foot, the inner surfaces of the angled socket member legs being formed to substantially mate with the socket engaging faces of said foot when the foot is telescoped within the socket member, and the included angle in cross-section between the socket legs being slightly less than the included angle between the socket engaging faces of the foot and forming spaced zones of contact between said socket legs and said socket engaging faces of the foot adjacent the outer edges of said socket legs.

2. The construction defined in claim 1 in which the corners between the concave foot face and the flat foot faces are slightly rounded in cross-section; and in which the foot at each corner when telescoped within a socket member welded to a pole engages the socket member and pole with line contacts closely adjacent each other between the foot, and the surfaces of the socket member and pole.

References Cited in the file of this patent

UNITED STATES PATENTS

| | | |
|---|---|---|
| 591,960 | Dyer | Oct. 19, 1897 |
| 614,177 | McBride | Nov. 15, 1898 |
| 925,524 | Steinmetz | June 22, 1909 |

FOREIGN PATENTS

| | | |
|---|---|---|
| 12,196 | Great Britain | May 25, 1906 |